(12) United States Patent
Porter et al.

(10) Patent No.: US 10,891,549 B2
(45) Date of Patent: Jan. 12, 2021

(54) SYSTEM AND METHOD FOR INTELLIGENT RESOURCE RANKING AND RETRIEVAL

(71) Applicant: Gluru Limited, London (GB)

(72) Inventors: Tim Porter, London (GB); Simon Rawles, Cambridge (GB); James Hammerton, London (GB); Michele Sama, London (GB)

(73) Assignee: GLURU LIMITED

( * ) Notice: Subject to any disclaimer, the term of this patent is extended or adjusted under 35 U.S.C. 154(b) by 857 days.

(21) Appl. No.: 15/368,263

(22) Filed: Dec. 2, 2016

(65) Prior Publication Data

US 2017/0161624 A1 Jun. 8, 2017

Related U.S. Application Data

(60) Provisional application No. 62/261,976, filed on Dec. 2, 2015.

(51) Int. Cl.
*G06N 5/04* (2006.01)
*G06F 16/14* (2019.01)

(52) U.S. Cl.
CPC .............. *G06N 5/04* (2013.01); *G06F 16/14* (2019.01)

(58) Field of Classification Search
CPC .................................. G06N 5/04; G06F 16/14
See application file for complete search history.

(56) References Cited

U.S. PATENT DOCUMENTS

| 8,407,214 B2 * | 3/2013 | Li | G06F 16/3338 707/726 |
| 2004/0215465 A1 * | 10/2004 | Lee | G10L 15/26 704/277 |
| 2012/0158702 A1 * | 6/2012 | Kumar | G06F 16/215 707/723 |
| 2013/0325972 A1 * | 12/2013 | Boston | G06F 16/345 709/206 |
| 2016/0225370 A1 * | 8/2016 | Kannan | G10L 15/22 |
| 2016/0247165 A1 * | 8/2016 | Ryabchun | G06Q 30/0201 |

OTHER PUBLICATIONS

Casali, Ana, et al., 'A Tourism Recommender Agent: from theory to practice,' Intelegencia Artificial, Revista Iberamericana de Intelegencia Artificial, (2008) pp. 23-28, vol. 12, No. 40.

* cited by examiner

*Primary Examiner* — Eric Nilsson
(74) *Attorney, Agent, or Firm* — Scheinberg & Associates, PC; John B. Kelly; Michael O. Scheinberg

(57) ABSTRACT

A computer-implemented machine-learning method and system for searching for resources by predicting an intention and pushing resources directly to users based on the predicted intention. The method includes receiving a description of a context; generating a set of weighted expressions, each weighed expression comprising a restriction over the description of the context and a confidence factor resulting between the combination of the user model and of the query input; and generating a sorted list of resources matching the weighted list of expressions. The system includes computer instructions for an intention inference engine and an intelligent ranking engine.

25 Claims, 7 Drawing Sheets

Information Space

|  | Prior Art filesystems | Prior Art Taxonomies and Folksonomies | Related Files 106 |
|---|---|---|---|
| Exploration | Static drives and folders | Manually applied tags | Dynamically generated related files view |
| Underlying structure | Tree | Graph | Hypergraph (multi-dimensional graph) |
| Resources | Only files | Any type of document | Any type of document |
| Navigation actions | Navigate folder | Navigate tag | Mute result (restrict search space) Explore result (open new search space) |

FIG. 6

SYSTEM AND METHOD FOR INTELLIGENT RESOURCE RANKING AND RETRIEVAL

This application claims priority from U.S. Provisional Application 62/261,976 filed Dec. 2, 2015, which is hereby incorporated by reference.

TECHNICAL FIELD OF THE INVENTION

The present invention relates to machine learning and more specifically to inferring intentions of a user to intelligently rank and retrieve computer-accessible recourses.

BACKGROUND OF THE INVENTION

Information systems, such as computers, are used to store, manage, and process electronic resources, such as electronic files, documents, images, videos, recordings, contact information, calendar information, messaging information, telephony information, mapping information, and the like. Resources are typically stored in non-volatile bulk storage devices such as magnetic media, optical media, and flash memory. Resources can be stored within bulk storage that is integrated locally into to a computer system. Resources can be stored within bulk storage that is geographically remote and accessible by means of a computer network, including, but not limited to, resources stored via cloud storage services accessible over the Internet. Resources can be distributed both locally and remotely to provide redundancy.

Resources are typically stored within a filesystem (e.g., FAT, NTFS, HFS, ext, XFS, NFS, SMB, etc.) of the bulk storage device or devices. As shown in the table of FIG. 6, the electronic resources are stored as files within the file system. In modern operating systems, a user typically accesses the filesystem using a file browser application, such as Windows Explorer. The underlying structure of prior art file systems is typically a hierarchical tree. The top level or root level of the tree represents the entire filesystem. A user explores the filesystem by navigating through static folders (directories) that can be nested within another folder. The folders have a name that preferably is related to its contents. The user must determine from the folder names, or from the user's recollection, which folders to navigate through to get to a file stored in the filesystem.

Resources can also be located and accessed using taxonomies and folksonomies. The user is required to manually apply tags or keywords to resource. The resource can be any type of document. When trying to locate a resource, the user then uses a browser application, such as a web browser, to select tags that are related the resource. The resources are filtered by the tags, displaying only the resources assisted with the selected tags. Such systems are common with e-commerce web services. The underlying structure of a taxonomy or folksonomy is a graph.

Resources can also by located and accessed using recommender systems or "rankers." Recommender systems automatically recommend resources (e.g., products) to a user, for example in online stores, based on the user's similarity to other users with a similar purchase history. The decision of why a product was recommended is therefore essentially 'because you bought products X and Y'. Traditional recommender systems handle a single common resource space and infer similarities across users. Traditional recommender systems do not make recommendations based on a user's private resource space.

Locating and accessing resources quickly and efficiently is an objective of any user of an information system. Prior art systems typically require users to manually create a hierarchical folder tree in which to stores files or manually apply tags to documents to enable subsequent filtering. To locate a resource, the user must navigate the hierarchical folder tree or a pick the right tags to locate the resources. What is needed is a way for the information system to infer the intention of the user based on a particular context associated with one or more states of the system and recommend resources to the user based on the inferred intention. Further, what is needed is way for the information system to learn from its inferences so that the system will automatically make more accurate recommendations over time.

SUMMARY OF THE INVENTION

Embodiments of the present invention are directed to a computer system comprising a processor and a non-transitory computer-readable memory, the memory encoded with computer-executable instructions for searching for resources by predicting an intention and pushing resources directly to users based on the predicted intention. The instructions provide for an intention inference engine which receives, as an input, a description of a context and generates, as output, a set of weighted expressions, each weighed expression comprising a restriction over the description of the context and a confidence factor resulting between the combination of the user model and of the query input. The instructions also provide for an intelligent ranking engine which receives, as input, the weighted list of expressions generated by the intention inference engine; and generates, as output, a sorted list of resources matching the weighted list of expressions.

Other embodiments of the present invention are directed to a non-transitory computer-readable medium encoded with computer-executable instructions for searching for resources by predicting an intention and pushing resources directly to users based on the predicted intention. The instructions provide for an intention inference engine which receives, as an input, a description of a context and generates, as output, a set of weighted expressions, each weighed expression comprising a restriction over the description of the context and a confidence factor resulting between the combination of the user model and of the query input. The instructions also provide for an intelligent ranking engine which receives, as input, the weighted list of expressions generated by the intention inference engine; and generates, as output, a sorted list of resources matching the weighted list of expressions.

Other embodiments of the present invention are directed to a computer-implemented machine-learning method for searching for resources by predicting an intention and pushing resources directly to users based on the predicted intention. The method includes receiving a description of a context; generating a set of weighted expressions, each weighed expression comprising a restriction over the description of the context and a confidence factor resulting between the combination of the user model and of the query input; and generating a sorted list of resources matching the weighted list of expressions.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

FIG. 6 is a table comparing prior art file explorers and prior art taxonomies and folksonomies with embodiments of the present invention.

DETAILED DESCRIPTION OF PREFERRED EMBODIMENTS

Figure 1:
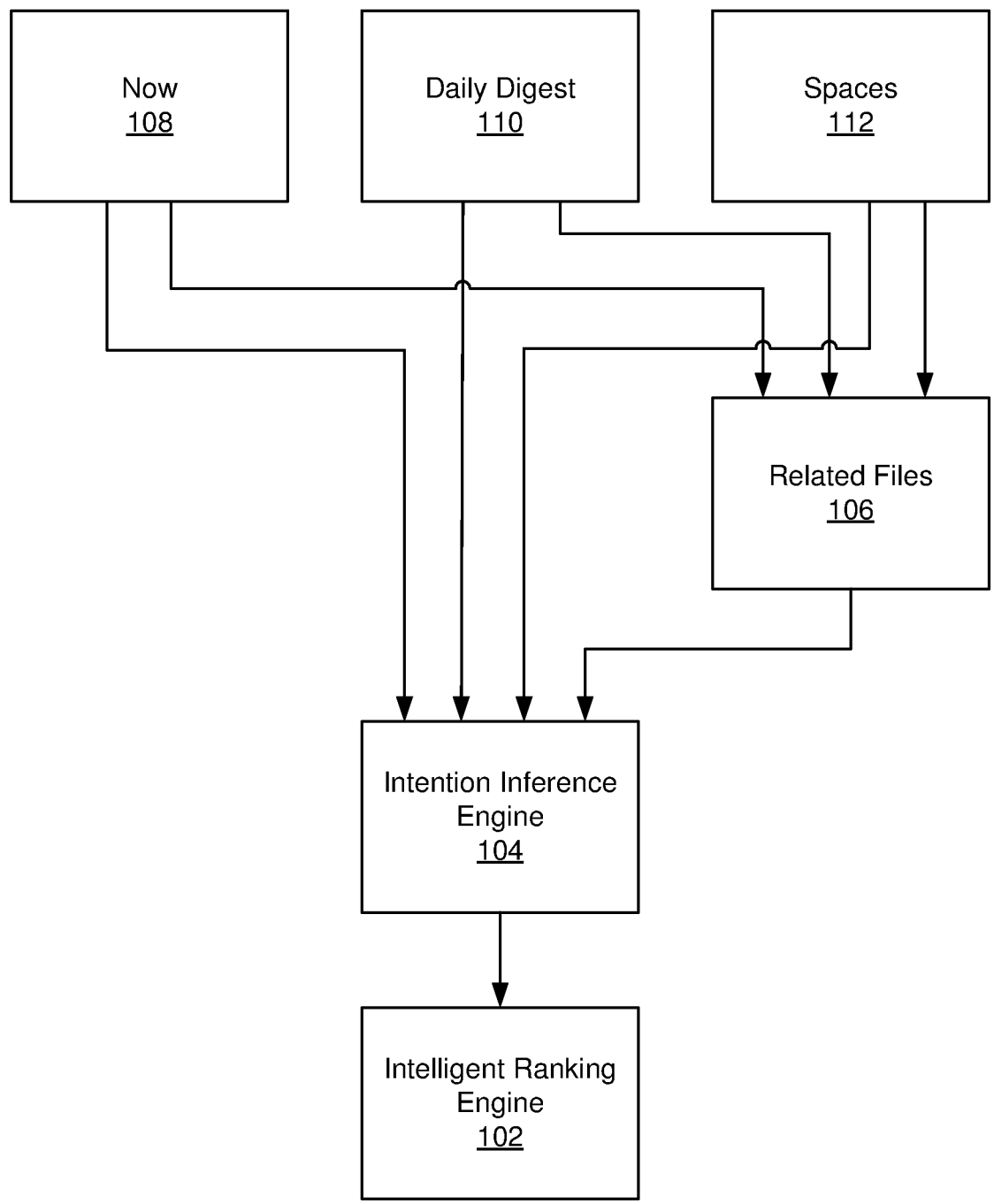
FIG. 1 shows a dependency diagram in accordance with one or more embodiments of the present invention.

Embodiments of the invention are directed to improved methods and systems for searching for and retrieving data resources by predicting, using machine learning, which resources are needed by a user and pushing those resources directly to users. Embodiments of the invention are directed to a computer-implemented platform comprising various components as shown in the dependency graph of FIG. 1. Each component of the platform has a unique role in generating the final user experience. Each component is realizable as a set of computer-executable instructions encoded in a non-transitory computer-readable medium, such as, but not limited to, one or more computer programs, applications, or libraries.

The components of the platform include intelligent ranking engine 102, intention inference engine 104, related files 106, now 108, daily digest 110, and spaces 112. Intelligent ranking engine 102 is a component that is given as input a weighted list of expressions. Intelligent ranking engine 102 generates as output a sorted list of resources matching those expressions. Intention inference engine 104 is given as inputs a set of signals describing how users use files and a search query. Intention inference engine 104 generates as output a list of weighted expressions indicating an inference of what the user intends to do. The list of weighted expressions can be used as input to intelligent ranking engine 102. Related files 106 converts a given resource into a search query that can be used by intention inference engine 104 and consequently by intelligent ranking engine 102 to generate resources similar to the given resource. Resources comprise any stored data that is retrievable from an information system and displayable to a user on a device. Resources, as used herein, includes, but is not limited to, electronic files, documents, images, videos, recordings, contact information, calendar information, messaging information, telephony information, mapping information, and the like. Resources can be stored on the user's device. Resources can be stored remotely on devices accessible by means of a computer network, including, but not limited to, resources stored via cloud storage services accessible over the Internet. Now 108 preemptively reads the current context from the user's data and converts it into a search query that can be used by intention inference engine 104 and subsequently by intelligent ranking engine 102 to generate resources which the user would need right now. After now 108 has surfaced initial resources, users can use related files 106 to explore further. For each user, daily digest 110 extracts daily events and important people and decorates the daily events and important people with related resources by querying intention inference engine 104 and intelligent ranking engine 102. After daily digest 110 has surfaced initial resources, then users can use related files 106 to explore further. Spaces 112 identifies projects and automatically selects and adds resources to the identified projects by using intention inference engine 104 to identify the underlying intention and intelligent ranking engine 102 to select resources over time. After spaces 112 has surfaced initial resources, users can use related files 106 to explore further.

Intention inference engine 104 is a component that uses contextual information to predict user intentions. An intention, as used herein, is a concrete goal that users wish to achieve, at least in part, by retrieving a required resource from an information system. Because the platform has access to these required resources, to current sensor readings provided by the device, and to a stream of historical data, intention inference engine 104 can infer these intentions on a user-by-user basis. From repeated observations of a user's behavior, user models are constructed that are sets of facts, understandable and revisable by both a human and a computer. These user models of users' behavioral tendencies are used in a deductive process to guide the search for items of interest to them. Given a user model, intention inference engine 104 responds to inference queries in which the input is the description of a context and the output is a set of labelled weighted expressions (L, E, W), where L is a label, where the expression E represents a restriction over a contextual dimension, and where W represents a confidence factor resulting between the combination of the user model and of the query input.

The platform is able to receive, collect and process a stream of user-related signals. Signals include sensor data (e.g. sensor data one or more devices used by the user, such as a GPS location signal), connected resources and the updates to them (e.g., cloud storage services), external triggers such as incoming phone calls, and user's positive or negative interaction with predictions (e.g., likes or dislikes). Machine learning techniques are used to link combinations of signals which together contribute to a successful prediction to inferred intentions that relate to the prediction.

User models are generated and updated in the background, server side, by post processing historical signals and by extracting similarity patterns. Identifying similarity patterns is the equivalent of solving sub-classification problems in which only a subset of the problem dimensions is used for the solution. For each pattern, a resulting set of expressions is defined. The resulting set of expressions is the output that intention inference engine 104 will return. When the intention inference engine 104 receives a query, the query is distributed to the various patterns. The result of each pattern is then labelled and returned as a set of weighted expressions. Intelligent ranking engine 102 can then use the label in determining the scoring of the ranked resources. The system can be virtually extended with any sort of supervised patterns. A non-comprehensive list of supervised patterns includes recency, relevance, trending relevance, topic, periodicity, priority/urgency, expectancy, unmet expectancy, ordering (historical/logical).

Recency is a supervised pattern that attempts to restrict the search space by examining the last modified timestamp of resources and by inferring that the user is only interested in resources modified within a certain time range. Recency is useful when users are looking for recent documents or for documents relevant to past projects or activities. The concept of recency varies by user. Examples of output are expressions like:

("lastsave>1445537360", 0.4), and ("1445437360<lastsave<1445537360", 0.2).

Relevance is a supervised pattern that restricts the search space by correlating the input query with certain other dimensions. For instance, a user could search for the keyword "Germany" with the intention of finding resources related to a trip to Berlin or to actually find resources where the location is Germany. The relevance supervised pattern itself correlates the input with the output, therefore its output only contains the result of the inferred correlation. Examples of output are expressions like:

("keyword='Berlin' and 1445437360<lastsave<1445537360", 0.4), and ("location=Germany", 0.3).

Trending relevance is a supervised pattern that upscores resources related to trending or bursting interests in the user's recent activity, for example a spike of interest in a particular topic. The output expressions have the same form as the output expressions for the relevance pattern.

Topic is a supervised pattern that restricts the search space by filtering resources relevant to a certain set of topics. The topic supervised pattern is useful when searching documents by similarity with other documents. Examples of output are expressions like:

("topic in [holiday, family, fun]")

Periodicity is a supervised pattern that attempts to identify when a user's behavior is similar to behavior exhibited in the past, according to a fixed pattern, either a certain time ago, or a given time of day or the week. When the query contains a time component this pattern upscores components which are relevant in that period, e.g. every weekend, every summer, every morning.

Priority/Urgency is a supervised pattern that identifies and prioritizes resources which are classified as more important for the user. For instance, the system would spot that a user always quickly replies to his manager's emails and would start prioritizing them. Urgency is a strong component of results selected for now 108.

Expectancy (of the user) is a supervised pattern that identifies signals of an expectation of a follow up action from the user which hasn't happened yet (e.g., open comment on a document or ticket which hasn't come yet, or email prompting a reply) and up-scores the signals. Expectancy is a strong component when selecting documents for important people in daily digest 110.

Unmet expectancy (of the user) is a supervised pattern that identifies signals for which the user expects a follow up. Unmet expectancy includes, for example, a request the user sent that has not been replied to. Unmet expectancy is a strong component when selecting documents for important people in daily digest 110.

Ordering (Historical/Logical) is a supervised pattern that identifies ordering in resources and applies the ordering when searching for related files. Ordering can identify emails in a thread as well as sequences of relevant documents (e.g., a sales pitch followed by a quote followed by a contract).

Figure 2:
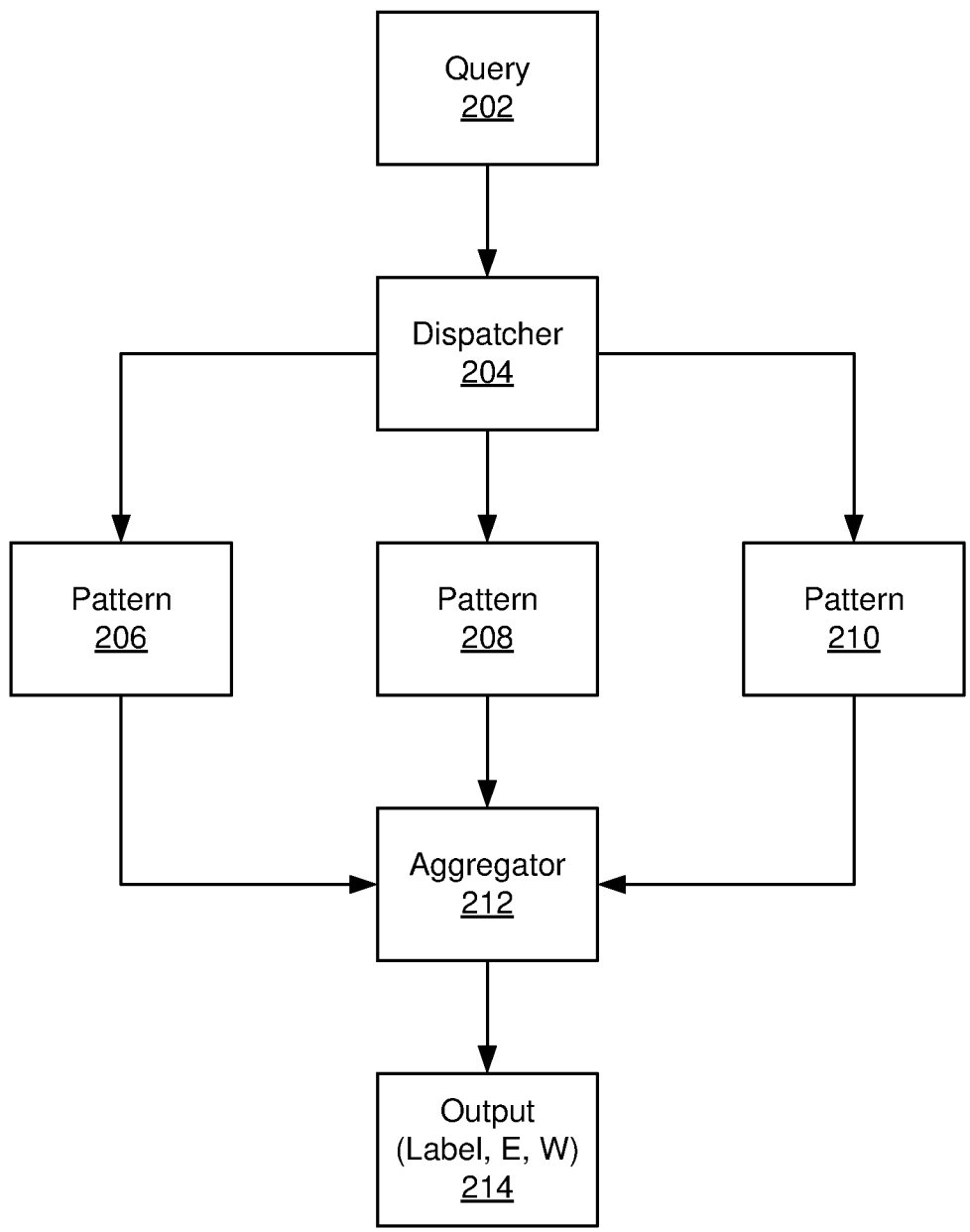
FIG. 2 is a flowchart showing how intention inference engine 104 generates output using supervised patterns.

FIG. 2 is a flowchart showing how intention inference engine 104 generates output using supervised patterns. Intention inference engine 104 receives a query 202. Dispatcher 204 dispatches query 202 to one or more supervised patterns, shown in FIG. 2 as patterns 206, 208, and 210. The result of each pattern is labelled and returned, by way of aggregator 212, as a set of weighted expressions 214. Intelligent ranking engine 102 can then use the labels in determining the scoring of the ranked resources.

Intelligent ranking engine 102 ranks resources by a given intention. Given a weighted and labelled list of expressions generated by intention inference engine 104, intelligent ranking engine 102 generates a sorted list of resources matching the user's intention. To produce this ranking, intelligent ranking engine 102 filters resources using the given weighted and labelled list of expressions and ranks the resources by relevance combined with the given weights.

Intelligent ranking engine 102 accepts a model of the user's likely intent and uses the model in the recommendations made to the user. Using the labels in the various expressions, intelligent ranking engine 102 explains in natural language (e.g. English) to the user both the model of user intent that is being used by intelligent ranking engine 102 and the reason why specific resources have been recommended to the user. Intelligent ranking engine 102 handles private users' resource spaces, which may differ considerably from each other, though intelligent ranking engine 102 may also include modelling of behaviors common to all users or across groups of users to inform its decisions.

Intelligent ranking engine 102 receives, as input from intention inference engine 104, a list of expressions annotated with a human-readable label which identifies the supervised pattern that generated the expressions and a weight which represents the confidence factor. Intelligent ranking engine 102 filters the information space using the given expressions and scores the documents in the information space by similarity with the given expression weighted with the given confidence factor. The result of this process is a list of labels with partial scores, where the highest scores represent an explanation of why a resource is considered relevant. These labels are then translated into natural language by a natural language generator. The final score of each resource is a computed by combining the various partial scores.

An example of the function of intelligent ranking engine 102 is as follows. A user visits a company X for a meeting with a set of people Y. The user sees, on the user's device, "At X for an upcoming meeting with Y," as an explanation of the context. A list of documents appears on the device. One of the documents is a requirements document for a project which has been going back and forth between people, some of whom are attending the meeting. The user sees the requirements document with the annotation: "Because Y1, Y2 and others are attending the meeting." Another document is a proposal which the user has been working on to give to X at a later date. The user sees the proposal document annotated with: "Because the document relates to X." The user can reward the system by clicking beside these recommendations.

Another example of this process is as follows. A user is logging in for the first time that day. The user is working from home. The user sees: "Logging in from home." Each day the user edits a shared file to log what they did that day for the rest of the user's team, T, to see. The user sees a link to the document, with the explanation: "Because you access this document at approximately 9:00 am each morning." The user has been working on a proposal about X with the rest of the team which is due today, and the user sees a link to the proposal document. The link reads: "Because you've mentioned X in your documents and emails shared with T lately, and you're about to have a meeting with T." The user can reward the system by clicking beside these recommendations.

Related files 106 is a smart resource browser. Instead of browsing resources by drives and folders, and instead of showing a fixed folder structure, related files 106 lets users explore files by relevance to a certain intention that they are trying to express. The intention is generated by the intention inference engine 104 which is then used to retrieve sorted lists of resources from the intelligent ranking engine 102. In traditional file system browsers, users can navigate files by folder. Using related files 106, users can navigate files by exploring other related files. In a traditional file system browser, files are located in one single folder. In related files 106, a file can be "related" and therefore accessible from various other files. FIG. 6 shows attributes of prior art file systems, prior art taxonomies, prior art folksonomies, as compared to related files 106. Resource exploration in related files 106 is performed by way of a dynamically generated files view. The underlying structure is a multi-dimensional hypergraph. Related files 106 can be used with any time of document. Navigation actions available to the user in related files 106 include mute result and explore result. Mute result restricts the search space. Explore result opens a new search space.

Figure 3:
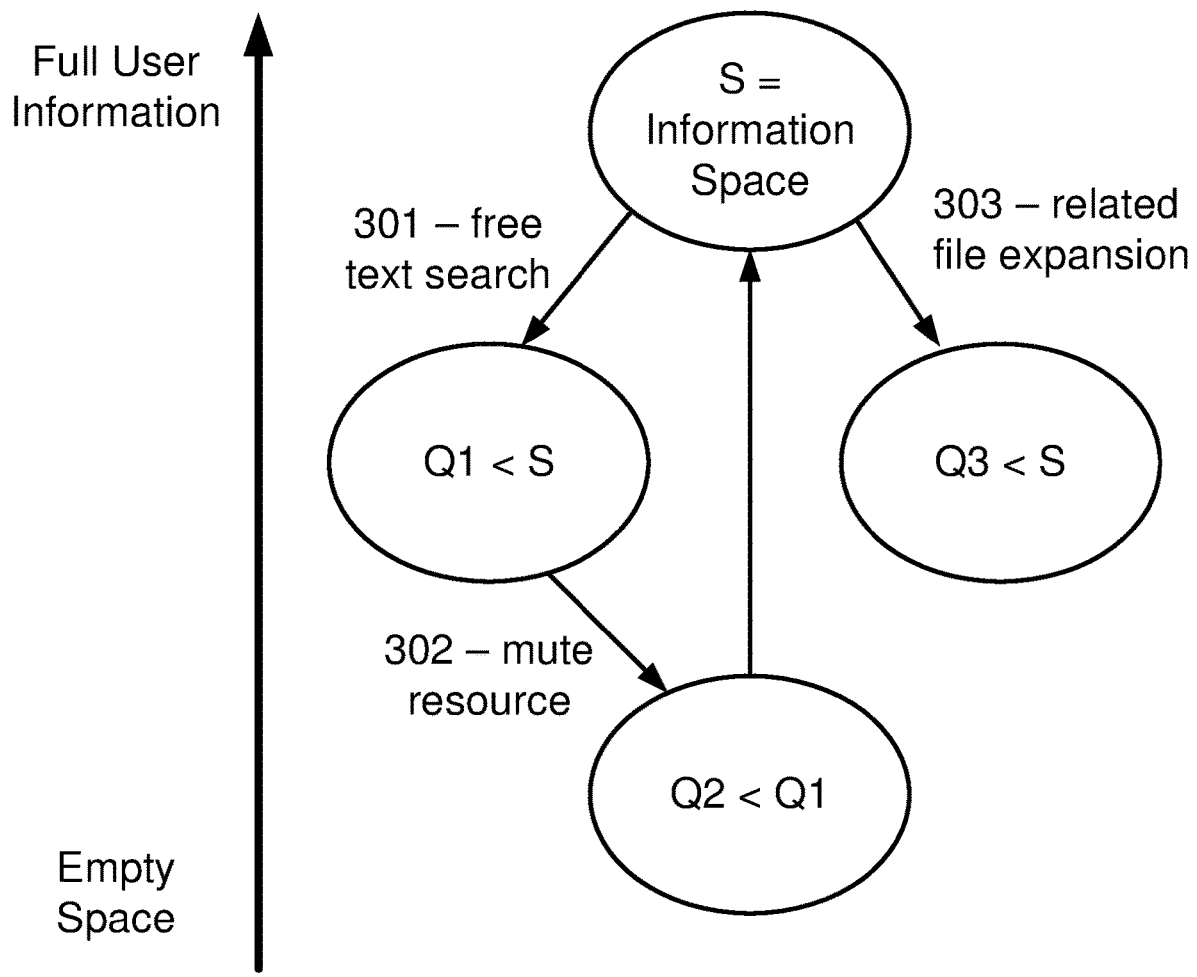
FIG. 3 is a state diagram that shows the navigation actions of related files 106.

FIG. 3 is a state diagram that shows the navigation actions of related files 106. State S represents the state comprising the full user information space, that is, all user information accessible by the platform. Users can directly access related files 106 by performing a free text search 301 in a client application. In response to free text search 301, the state moves from state S to state Q1, where the amount of user information in state Q1 is less than state S. The client application automatically shows related resources in various views including now 108 and daily digest 110.

When shown a set of related resources, the user can flag a resource as not relevant, removing it from the list of results and training the intention inference engine 104 to downscore the components of that resource within the context of that intention. This action is called "muting" and is shown in FIG. 3 as state change 302, the change from state Q1 to state Q2. State Q2 includes less user information than state Q1. That is, after muting a resource 302, intention inference engine 104 can update the result, Q2, by pruning solutions from the original search space, Q1.

When shown a set of related files, the user can open a file, thereby telling the system that the user has found what the user needed and consequently training intention inference engine 104 to upscore the components of that resource within the context of the current intention.

When shown a set of related files, the user can explore a resource by asking intention inference engine 104, and consequently intelligent ranking engine 102, to update the intention and therefore perform a new search using the selected resource as query. This is shown in FIG. 3 as the return to state S from state Q2 and state change from state S to state Q3 (related file expansion 303). Intention inference engine 104 also mildly upscores the components of the explored resource by learning that, although the resource was not exactly what needed, the resource was relevant.

Related files 106 can be used to perform a free text search for resources. For example, a user searches for "Germany". Related files 106 returns a list of resources including the confirmation of a plane ticket to Berlin and a file containing the catalog of a German brand of kitchenware. Intention inference engine 104 converted the free text search "Germany" in the intention to see resources related to the topic "Germany". Intelligent ranking engine 102 uses that intention to generate a weighted list of candidate resources. As the user mutes the kitchen catalog as not relevant, intention inference engine 104 updates the results giving less relevance to files relevant to "kitchenware". As the user navigates to the plane ticket to Berlin, intention inference engine 104 will receive a query to infer the intention of seeing resources related the plane ticket to Berlin for which, once again, intelligent ranking engine 102 will generate a list of resources. Intention inference engine 104 will also infer that the user associates the user's trip to Berlin as related to the keyword "Germany". As the user opens a file related to a customer in Germany that he met during his travel to Berlin, related files 106 will upscore the fact that the user associates Berlin with documents related to a certain customer.

Related files 106 can be used to find resources related to calendar events. For example, daily digest 110 presents a list of calendar events with associated attendees and files, as explained above with respect to FIG. 1. A user has a product pitch meeting with a new customer. One of the relevant resources for that meeting is an introductory email. As the user selects and navigates that email presented, intention inference engine 104 will convert the user's selection and navigation into the intention of finding resources related to that email thread (e.g., text, topics, recipients, attachments, date and times). The result generated by intelligent ranking engine 102 for this refined intention includes a company presentation deck, which was the file the user was looking for. Intention inference engine 104 will then reinforce the fact that for the user the company presentation deck is relevant in the context of a product pitch meeting.

Related files 106 can be used for navigating results from now 108. As described above with respect to FIG. 1, now 108 shows a list of resources relevant to the intention that intention inference engine 104 has inferred as currently in progress. For example, a user just missed a phone call and now 108 is showing a list of resources relevant to the caller, including a forthcoming meeting and a recently received email. In the email the user was asked to share a document before the forthcoming meeting. The user navigates the email, thereby asking intention inference engine 104 to improve the context, which results in intelligent ranking engine 102 proposing the document be shared as a candidate result.

Figure 4:
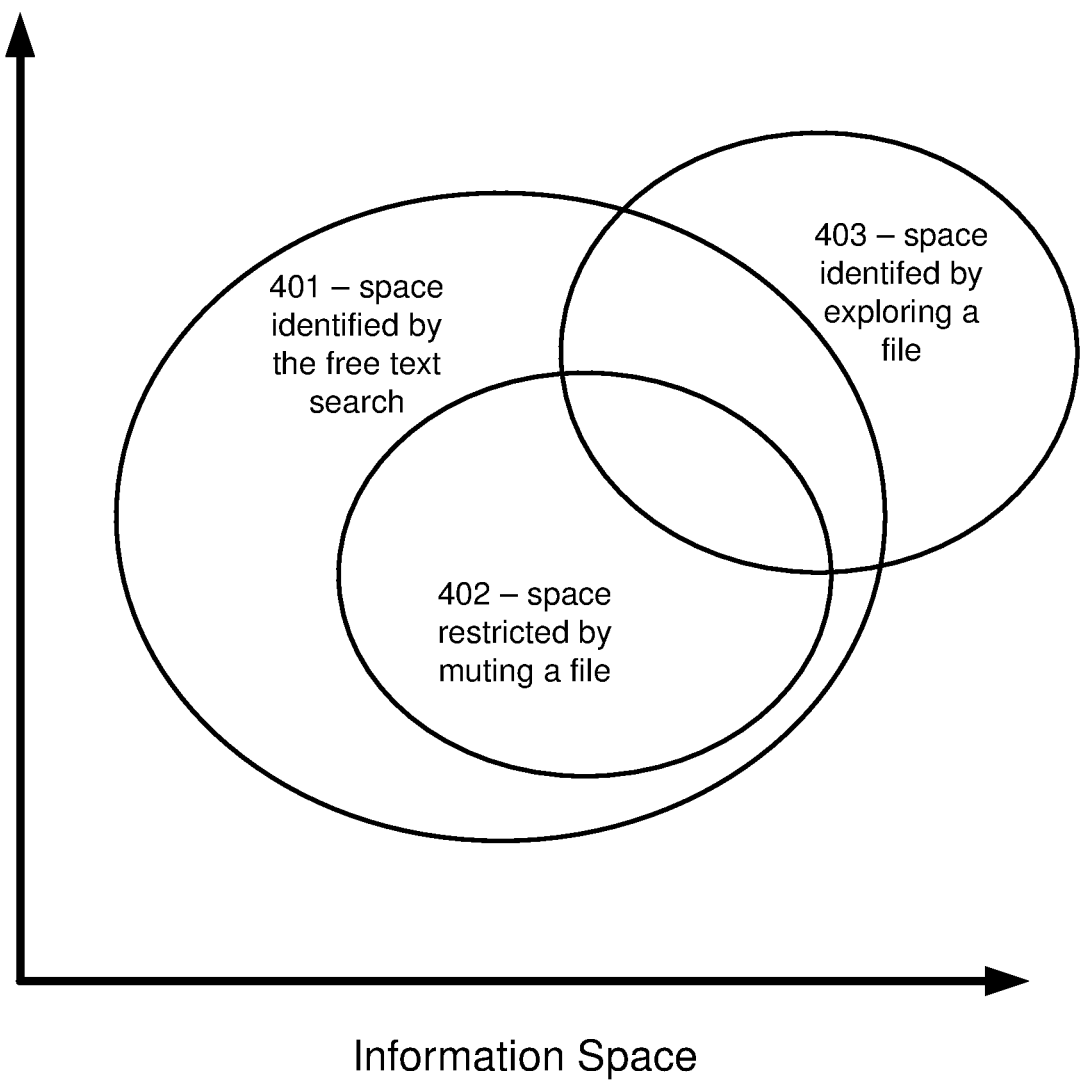
FIG. 4 is a Venn diagram that shows the navigation actions of related files 106.

FIG. 4 is a Venn diagram that shows the navigation actions of related files 106.

Starting from the full space of resources that the user owns, related files 106 shows views on the data which are used as starting points for the navigation. Examples of views are the views generated by now 108, by daily digest 110, by spaces 112, or by a traditional free text search. Such views are a restriction on the user information space. Space 401 shows a space identified by a free text search. Users have the option to downscore documents in those view by muting/discarding predicted resources. Related files 106 interprets that action as the intention of the user of seeing "less resources like that" and therefore it enhance the query by excluding unrelated results, shown in FIG. 4 as space 402. Users have also the option to explore a file. Related files 106 interprets that action as "more resources like this" and executes a new intention inference engine 104 search by converting the selected file as search query, shown in FIG. 4 as space 403.

Related files 106 also enables intention inference engine 104 to learn from each user interaction. As users discard or explore files, related files 106 extracts components of the files and teaches intention inference engine 104 to down or up vote those components for the current query. For instance, in the example of a user searching for "Germany" and exploring a plane ticket to Berlin, related files 106 would upscore the association between "Germany" as a keyword with the concept of Germany as a location the topic of travelling.

Now 108 is a preemptive file retriever. Now 108 provides preemptive file retrieval by current intention. Now 108 removes the user's need to search for resources to complete their current tasks by proactively feeding the user with those resources. Intention inference engine 104 is capable of using recent changes in a user's data or sensory data from the user's devices, to predict the user's possible current or future intentions. After an intention has been inferred, intelligent ranking engine 102 proactively filters, ranks, and recommends resources that the user would need to complete the inferred action, thereby removing the need for manually searching and locating such required resources. Suggested resources are selected from a pool of resources that the user has directly or indirectly connected to the platform and that have been indexed inside the intelligent ranking engine 102 and on which queries derived from the user's intentions can be performed.

Figure 5:
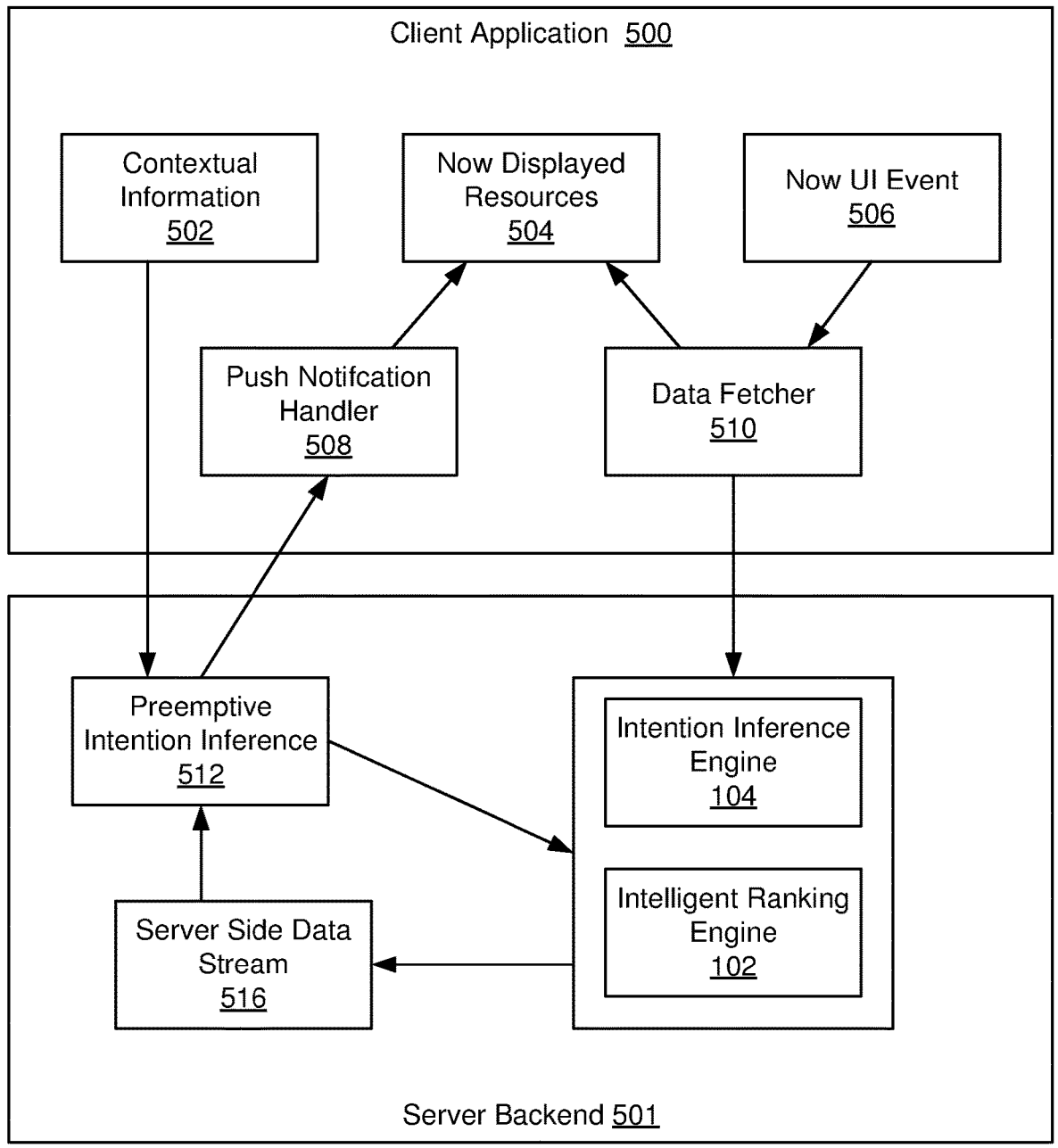
FIG. 5 is a diagram showing an exemplary embodiment of a client application and server backend.

FIG. 5 is a diagram showing an exemplary embodiment of a client application and server backend. Both in client application 500 and in server backend 501, either automatically in response to events, or manually upon user request, now 108 infers the current user intention and uses it to select and display resources filtered and ranked by relevance to the current intention inferred by now 108. In one or more embodiments, client application 510 runs on computer system 700, such as a user's smartphone or tablet device, and server backend 501 runs on remote computer system 726. Computer system 700 and remote computer system 726 are described in further detail below with respect to FIG. 7.

A registered user can manually trigger now 108 through the user interface of client application 500 (now UI event 506), for example, by pressing an icon or button labelled "Now" in client application 500. In response to the user manually triggering now 108, client application 500 collects and processes contextual information 502 which could be used to infer the user's intention. Examples of contextual information 502 that can be used to infer the current intention include, but are not limited to, calendar events, emails, phone calls, instant messages, location, time, connected Bluetooth devices and WIFI networks.

The processing is initiated client side and completed server side by intention inference engine 104 and intelligent ranking engine 102. Examples of information include time, location, connected devices, recent emails, recently edited notes or documents and their metadata. Using such information intelligent ranking engine 102 searches the user's information space for relevant resources, ranks them by relevance, and generates a list of candidate resources shown in FIG. 5 as server side data stream 516. The ranking is computed by combining a relevance factor with the user's context combined with a user-specific weighting which considers which aspects of the context are important to the user. Selected resources are then post-processed to extract relevant information such as relevant users, companies, topics or web links. The result is sent to push notification handler 508 which notifies the user and/or presents the user with a screen containing that result, now displayed resources 504. The result will be cached and considered valid as long as the user's context remains the same.

Similarly, on the device, client application 500 constantly monitors for contextual changes sends the contextual changes to server backend 501 and, using an algorithm for contextual inference, the client application will determine what the user is doing and if and when he may need to receive information. For example, upon receiving a phone call from a known contact, client application 500 triggers a now 108 request and pushes to the user a list of related emails, documents, or contacts. Partial inferences can be performed on the client side to aid with responsiveness/efficiency.

Some other examples of now 108 include the following scenarios. If a shared file is edited by peers when a user invokes now 108 by pressing the "Now" button in the user interface (now UI event 506), then the edited file will be shown as important because other people are working on it. If a user has a calendar event scheduled and invokes now 108 by pressing the "Now" button in the user interface, then the system will generate a list of resources, displayed by client application 500 (now displayed resources 504), that are relevant to that meeting by considering both the meeting topic and its attendees. If a peer emails a user or shares a document and then calls the user, then the user will receive a notification from push notification handler 508 underlining the email or the shared document.

Daily digest 110 can predict which resources a user is likely to interact with on a given day based on commonalities in the user's behavior. For example, daily digest 110 can predict that the user will interact with certain other people, work with certain companies, attend certain meetings or work on certain documents that day. For each prediction, intention inference engine 104 in combination with intelligent ranking engine 102 will surface resources relevant to the prediction. Users can then give feedback in daily digest 110 to say whether a prediction was in fact relevant or not. From this feedback, the system can learn to do a better job in future predicting which resources a user is likely to interact with on a given day.

By looking at the resources intelligent ranking engine 102 has selected as relevant for a given day, intention inference engine 104 predicts which people (the important people) a user might interact with that day, or which events the user might attend that day, and intelligent ranking engine 102 further decides which of the user's documents might be relevant. A registered user with sufficient connected resources or who has some meetings set up in their calendar can view daily digest 110 via the client application and can opt to receive daily digest 110 content as an email each day. Daily digest 110 content is generated and periodically updated in the backend so that if new information arrives during the day, subsequent retrieval of daily digest 110 content includes that new information if relevant, and otherwise ensuring that when emails are sent they contain the most up to date information.

Important people are people that daily digest 110 predicts the user will be interacting with on a given day. These people are scored and ranked based on looking at how often they have sent resources to or shared and received resources with those people in a recent time period. The user's view of daily digest 110 is a 'today view' showing upcoming events, documents and people, including: a natural-language confirmation of (the important aspects of) the user's intentional context as modelled by the system and a list of recommended resources, such as documents, each showing an icon and a link to the resource, a brief explanation of the reason why the resource was recommended, and icons for the user to indicate whether the reason or recommendation was good or bad.

Some examples of daily digest 110 functionality include the following scenarios. If a user has ongoing interactions with another person, daily digest 110 may list that person as an important person and display files recently worked on by both the user and that person. If a user has a meeting with his team on a particular day, the meeting will be listed in daily digest 110 alongside relevant documents for the meeting. If a user has received but not replied to an email from an important person, daily digest 110 may contain a reminder to reply to that email.

Spaces 112 is an evolving intention-driven resource view. Spaces 112 reduces the hassle of organizing files in folders by inferring the intention of recurring actions that the user is doing and by automatically grouping user's resources that are relevant or that fulfill one of such intentions. This is particularly useful for organizing projects. Users intentions are inferred by intention inference engine 104. After recurring or predominant intentions are identified or selected by users, spaces 112 will use the intelligent ranking engine 102 to filter resources relevant to that intention and will create a view to present them to the user. Over time, as existing resources change or new resources are added, spaces 112 will adapt the view accordingly. The more a user interacts with such a view, by manually adding or removing files, the more spaces 112 will record such actions and fine tune the intention of the view and therefore the criteria with which resources are selected.

Spaces 112 can be integrated with a state machine representing a user workflow. As the updating of the state of the user's projects occurs, spaces 112 will learn from it and will eventually infer and predict state changes.

A user can manually select a group of resources which, in the user's opinion, fulfills a certain task or that logically has something in common. Given that pool of resources, spaces 112 extracts the common intention of those resources. Examples of such intentions are grouping resources discussing a certain topic, isolating resources useful for a certain customer, collecting photos taken on a certain holiday. As a user starts to work with a certain team or with a certain client on a certain project, intention inference engine 104 will eventually notice the existence of a certain emerging intention and will ask the user whether the user is interested in creating a view to quickly access resources related to that intention. After a certain task is completed, for instance a closed deal or after returning from a holiday, a user may decide to freeze the view of documents relevant to that intention. In that case the system will stop updating the view and will keep it as it is. A user creating a space for files related to a certain topic will see a view with all files relevant to the topic.

Figure 7:
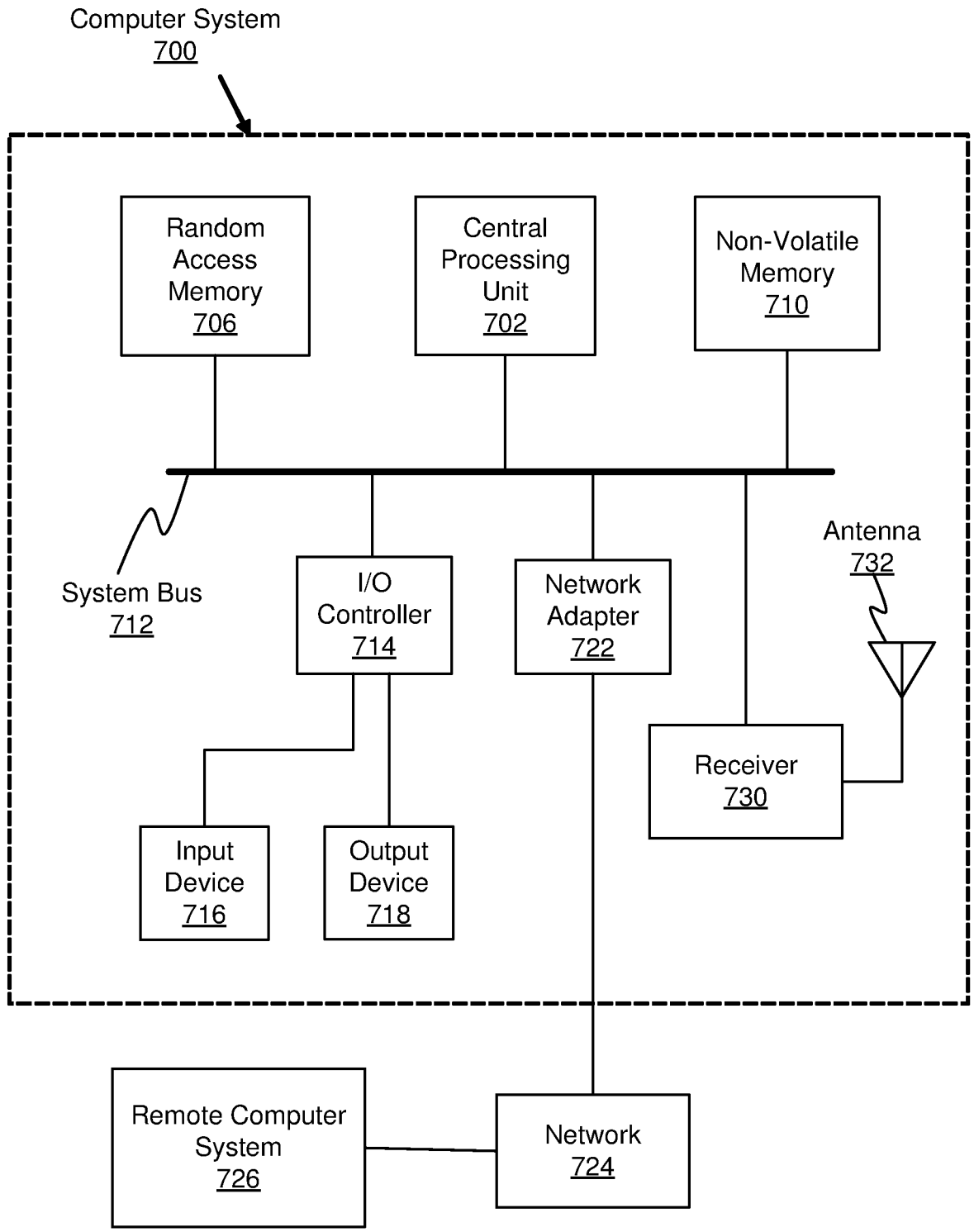
FIG. 7 is a diagram showing an exemplary computer system 700 suitable for storing and/or executing a computer program product in accordance with embodiments of the present invention.

At least one embodiment of the present invention is directed to a computer program product encoded in a non-transitory, computer-readable medium. The computer program product comprises computer-executable instructions that, when executed, causes one or more computer systems to perform embodiments of the present invention. FIG. 7 is a diagram showing an exemplary computer system 700 suitable for storing and/or executing a computer program product in accordance with embodiments of the present invention. Examples of computer system 700 include, but are not limited to, personal computers, laptop computers, tablet computers, smartphones, wearable smartdevices, personal digital assistants, workstations, file servers, mainframe computers, and virtual machines instantiated in a cloud computing or software-as-a-service (SaaS) environment.

Computer system 700 includes a central processing unit 702 having at least one microprocessor. Central processing unit 702 can be coupled directly or indirectly to memory elements through system bus 712. The memory elements comprise non-transitory computer-readable media capable of storing computer-executable instructions. The memory elements can include random access memory 706 employed during the actual execution of the program code and non-volatile memory 710 for longer term storage of data and instructions. One or more input devices 716 and output devices 718 can be coupled to system bus 712 either directly or through an intervening I/O controller 714. Examples of input device 716 include, but are not limited to, a pointing device, such as a mouse or a trackpad, or a keyboard. Examples of output device 718 include, but are not limited to, a display screen or a printer. Input device 716 and output device 718 can be combined into a single device comprising a touchscreen comprising a display screen (for displaying information to the user of computer system 700) having a touch-sensitive surface (for receiving input from the user). One or more network adapters 722 may also be coupled to computer system 700 to enable the system to become coupled to remote computer system 726 or remote printers or storage devices through intervening private or public networks 724. In some embodiments, a client application may execute on computer system 700 and communicate data with a server application executing on remote computer system 726. Modems, cable modems, Ethernet cards, and wireless network adapters are just a few of the currently available types of network adapters, though any network adapter capable of connecting computer system 700 to network 714 is within the scope of the present invention. Computer system 700 includes one or more receivers 730. Receiver 730 receives wireless signals via antenna 732. Receiver 730 can be adapted for receiving a location signal from a location-defining device or global positioning system (GPS). Receiver 730 can comprise a transceiver capable of both transmitting and receiving wireless signals. While various component devices of computer system 700 are shown as separate devices in FIG. 7 for purposes of demonstration, various component devices may be integrated into a single device as is known in the art, such as in a system-on-a-chip (SoC) device.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A computer system comprising a processor and a non-transitory computer-readable memory, the memory encoded with computer-executable instructions for:
   an intention inference engine which:
      receives, as an input, a description of a context;
      generates, as output, a set of weighted expressions, each weighted expression comprising a restriction over the description of the context and a confidence factor resulting between the combination of a user model and of a query input;
   an intelligent ranking engine which:
      receives, as input, the weighted list of expressions generated by the intention inference engine;
      generates, as output, a sorted list of resources matching the weighted list of expressions;
   creating a first training set comprising one or more resources a user has flagged as not relevant;
   training the intention inference engine using the first training set to downscore components of the one or more resources flagged as not relevant within the context;
   creating a second training set comprising one or more resources opened or explored by the user; and
   training the intention inference engine using the second set to upscore components of the one or more resources opened by the user within the context.

2. The computer system of claim 1 in which the intention inference engine generates the set of weighted expressions by:
   post-processing one or more historical signals;
   extracting at least one similarity patterns from the historical signals by solving sub-classification problems in which only a subset of the problem dimensions is used for the solution;
   defining a resulting set of expressions for each pattern.

3. The computer system of claim 1 further comprising a smart resource browser in which the smart resource browser displays the sorted list of resources matching the weighted list of expressions and receives a navigation action from the user, the navigation action comprising a mute action or an explore action.

4. The computer system of claim 3 in which, in response to receiving a mute action, the smart resource browser removes a resource indicated in the mute action from the sorted list of resources matching the weighted list of expressions and downscores components of the resource indicated in the mute action within the description of the context.

5. The computer system of claim 3 in which, in response to receiving an explore action, the smart resource browser starts a new search for the resource indicated in the explore action and upscores components of the resource indicated in the explore action within the description of the context.

6. The computer system of claim 1 further comprising a preemptive file retriever in which the preemptive file retriever, automatically or by manual user triggering, collects and processes contextual information, provides a description of a context using the contextual information, to the intention inference engine, and displays a sorted list of resources from intelligent ranking engine based on the description of the context provided by the preemptive file retriever.

7. The computer system of claim 1 in which the intelligent ranking engine generates a predictive daily digest, the predictive daily digest including resources relevant to a particular day.

8. The computer system of claim 1 further comprising an evolving intention-driven resource view in which resources are organized by inferring the intention of recurring actions that the user is doing and by automatically grouping resources that are relevant or that fulfill the intention.

9. The computer system of claim 1 in which the input to the intention inference engine further comprises current sensor readings.

10. A non-transitory computer-readable medium encoded with computer-executable instructions for:
    an intention inference engine which:
       receives, as an input, a description of a context;
       generates, as output, a set of weighted expressions, each weighted expression comprising a restriction over the description of the context and a confidence factor resulting between the combination of a user model and of a query input;
    an intelligent ranking engine which:
       receives, as input, the weighted list of expressions generated by the intention inference engine; and
       generates, as output, a sorted list of resources matching the weighted list of expressions;
    creating a first training set comprising one or more resources a user has flagged as not relevant;
    training the intention inference engine using the first training set to downscore components of the one or more resources flagged as not relevant within the context;
    creating a second training set comprising one or more resources opened or explored by the user; and
    training the intention inference engine using the second set to upscore components of the one or more resources opened by the user within the context.

11. The non-transitory computer-readable medium of claim 10 in which the intention inference engine generates the set of weighted expressions by:
    post-processing one or more historical signals;
    extracting at least one similarity patterns from the historical signals by solving sub-classification problems in which only a subset of the problem dimensions is used for the solution;
    defining a resulting set of expressions for each pattern.

12. The non-transitory computer-readable medium of claim 10 further comprising a smart resource browser in which the smart resource browser displays the sorted list of resources matching the weighted list of expressions and receives a navigation action from the user, the navigation action comprising a mute action or an explore action.

13. The non-transitory computer-readable medium of claim 12 in which, in response to receiving a mute action, the smart resource browser removes a resource indicated in the mute action from the sorted list of resources matching the weighted list of expressions and downscores components of the resource indicated in the mute action within the description of the context.

14. The non-transitory computer-readable medium of claim 12 in which, in response to receiving an explore action, the smart resource browser starts a new search for the resource indicated in the explore action and upscores components of the resource indicated in the explore action within the description of the context.

15. The non-transitory computer-readable medium of claim 10 further comprising a preemptive file retriever in which the preemptive file retriever, automatically or by manual user triggering, collects and processes contextual information, provides a description of a context using the contextual information, to the intention inference engine, and displays a sorted list of resources from intelligent ranking engine based on the description of the context provided by the preemptive file retriever.

16. The non-transitory computer-readable medium of claim 10 in which the intelligent ranking engine in-generates a predictive daily digest, the predictive daily digest including resources relevant to a particular day.

17. The non-transitory computer-readable medium of claim 10 further comprising an evolving intention-driven resource view in which resources are organized by inferring the intention of recurring actions that the user is doing and by automatically grouping resources that are relevant or that fulfill the intention.

18. A computer-implemented machine-learning method comprising:
receiving a description of a context;
generating a set of weighted expressions, each weighted expression comprising a restriction over the description of the context and a confidence factor resulting between the combination of a user model and of a query input;
generating a sorted list of resources matching the weighted list of expressions;
creating a first training set comprising one or more resources a user has flagged as not relevant;
training the intention inference engine using the first training set to downscore components of the one or more resources flagged as not relevant within the context;
creating a second training set comprising one or more resources opened or explored by the user; and
training the intention inference engine using the second set to upscore components of the one or more resources opened by the user within the context.

19. The method of claim 18 in which the set of weighted expressions is generated by:
post-processing one or more historical signals;
extracting at least one similarity patterns from the historical signals by solving sub-classification problems in which only a subset of the problem dimensions is used for the solution;
defining a resulting set of expressions for each pattern.

20. The method of claim 18 further comprising displays the sorted list of resources matching the weighted list of expressions and receiving a navigation action from the user, the navigation action comprising a mute action or an explore action.

21. The method of claim 20 in which, in response to receiving a mute action, removing a resource indicated in the mute action from the sorted list of resources matching the weighted list of expressions and downscoring components of the resource indicated in the mute action within the description of the context.

22. The method of claim 20 in which, in response to receiving an explore action, starting a new search for the resource indicated in the explore action and upscoring components of the resource indicated in the explore action within the description of the context.

23. The method of claim 18 further comprising, automatically or by manual user triggering, collecting and processing contextual information and displaying a sorted list of resources based on the description of the context.

24. The method of claim 18 further comprising generating a predictive daily digest, the predictive daily digest including resources relevant to a particular day.

25. The method of claim 18 further comprising inferring the intention of recurring actions that the user is doing and automatically grouping resources that are relevant or that fulfill the intention.

* * * * *